United States Patent [19]

Rademachers et al.

[11] Patent Number: 5,013,365

[45] Date of Patent: May 7, 1991

[54] IRON OXIDE BLACK PIGMENTS, PROCESSES FOR THEIR PREPARATION AND THEIR USE

[75] Inventors: Jakob Rademachers; Wolfgang Bockelmann; Wilfried Burow; Kurt Schäfer, all of Krefeld, Fed. Rep. of Germany

[73] Assignee: Bayer Aktiengesellschaft, Leverkusen, Fed. Rep. of Germany

[21] Appl. No.: 497,923

[22] Filed: Mar. 23, 1990

[30] Foreign Application Priority Data

Apr. 4, 1989 [DE] Fed. Rep. of Germany ....... 3910783

[51] Int. Cl.$^5$ ................................................. C09C 1/22
[52] U.S. Cl. .................................... 106/456; 423/634; 252/62.56
[58] Field of Search ................ 106/456; 423/632, 633, 423/634; 252/62.56

[56] References Cited

U.S. PATENT DOCUMENTS 4,631,089 12/1986 Rademachers ...................... 106/304

FOREIGN PATENT DOCUMENTS 0249843 12/1987 European Pat. Off. .

OTHER PUBLICATIONS

Chemical Abstracts, vol. 58, Ref. 4744C, Mar. 4, 1963—"Black iron pigment".

Primary Examiner—William R. Dixon, Jr.
Assistant Examiner—Chris Gallo
Attorney, Agent, or Firm—Connolly and Hutz

[57] ABSTRACT

A process is disclosed for preparing iron oxide black pigments obtained by the nitrobenzene reduction process, wherein the iron oxide black is heated to 400°–800° C. in a slightly oxidizing atmosphere with optional milling. The pigments are useful for coloring plastics, coatings and building materials.

12 Claims, No Drawings

IRON OXIDE BLACK PIGMENTS, PROCESSES FOR THEIR PREPARATION AND THEIR USE

The present invention relates to improved blue-tinged iron oxide black pigments obtained by the aniline process and having high colour strength and good thermal stability, processes for their preparation and their use.

Iron oxide black pigments are usually prepared either from aqueous iron salt solutions by the precipitation process or from metallic iron by the nitrobenzene reduction process (Ullmanns Encyklopädie der technischen Chemie [Ullmann's Encyclopaedia of Industrial Chemistry], 4the edition, Volume 18, page 603, Verlag Chemie, Weinheim 1979). In both processes, the iron oxide black pigment is obtained in the form of a water-containing filter cake, which is subsequently dried and milled.

DE-A 3 620 333 describes iron oxide black pigments obtained by the nitrobenzene reduction process, the said pigments being subjected to a heat treatment of 200° to 800° C. under a nonoxidising atmosphere. Iron oxide black pigments having a high colour strength can be obtained in this manner. The tinctorial quality also improves in the desired manner owing to the reduction in the brown hue in conjunction with an increase in the blue tinge.

However, it has been found in practice that this process gives iron oxide black pigments which do not have completely satisfactory thermal stability.

The object of the present invention is to provide iron oxide black pigments which do not have the disadvantage described.

It has been found that such iron oxide black pigments can be obtained by the process, according to the invention, for the preparation of iron oxide black pigments obtained by the nitrobenzene reduction process, which is characterised in that the iron oxide black pigment is heated in a final stage at temperatures of 400° to 800° C., preferably 600° to 700° C., in a slightly oxidising atmosphere and optionally is milled. The oxidising atmosphere can be most advantageously obtained with atmospheric oxygen containing 0.1 to 3% by volume, preferably 0.3 to 1.0% by volume, of oxygen.

Both a directly heated and an indirectly heated rotary tubular kiln can successfully be used as the heating oven. While in the indirectly heated rotary tubular kiln the slightly oxidising atmosphere can be established by feeding in air separately, in the directly fired oven the burner is preferably operated with the corresponding excess amount of air. However, the indirectly heated oven too can be supplied directly with the desired oxygen content from a separately operating burner for protective gas production. It is also possible to suck appropriate amounts of air into the oven by controlling the reducing pressure. However, an excess pressure procedure is usually preferred.

The iron oxide black is fed to the heating stage either in the form of the resulting filter cake having a solids content of about 60 to 70% by weight or as dry material.

Blue-tinged iron oxide black pigments which have high colour strength and good thermal stability are obtained in an advantageous manner by the process according to the invention.

The invention accordingly relates to the iron oxide black pigment obtained by the process according to the invention.

The methods of determination described below were carried out as follows:

(1) Colorimetric determination of the colour differences: according to DIN 6174 (CIELAB values). Binder: Alkydal L 64 resin (commercial product from Bayer AG).
(2) Colour strength: according to DIN 55,986. White reduction with five times the amount by weight of the $TiO_2$ pigment Bayertitan R-KB 2, binder: Alkydal L 64 resin (both commercial product of Bayer AG), equalisation criterion = lightness.
(3) Thermal stability (imco test). 1 l of product is introduced into a wire mesh cube made of phosphor bronze. The filled cube having a side length of 100 mm is placed in the centre of a laboratory oven with internal air circulation. The oven is heated to 110° C. and kept at this temperature for 12 hours. If a temperature of more than 200° C. occurs in the interior of the sample, the sample is not stable at the selected oven temperature (110° C. in this case).

This invention also relates to the use of the iron oxide black pigments obtained by the process according to the invention for colouring coatings, plastics and building materials.

The Examples which follow are intended to illustrate in more detail the process according to the invention for the preparation of improved iron oxide black pigments.

EXAMPLE 1

A water-containing (10% of $H_2O$), brown-tinged iron oxide black pigment (intermediate for Bayferrox 120 N = commercial product of Bayer AG) obtained by the nitrobenzene reduction process was fed in an amount of 200 kg per hour to a directly heated rotary tubular kiln having a length of 12 m and an internal diameter of 0.80 m. Flue gases from the combustion of 10.5 $m^3$ (S.T.P.)/h of natural gas with 95 $m^3$ (S.T.P.)/h of air were passed countercurrent through the oven. The temperature of the burner gases decreased to 680° C. as a result of the admixture of 195 $m^3$ (S.T.P.)/h of inert gas (nitrogen). As a result of the combustion of natural gas in an excess of air ($\lambda = 1.06$), the oxygen content was 0.4% by volume. The maximum product temperature at the outlet of the oven was 650° C. After the product had been cooled under inert gas, an iron oxide black pigment having a colour strength of 148%, relative to Bayferrox 330 (commercial product of Bayer AG) was obtained. Measurement of the hue in a white reduction gave a blue tinge of $\Delta b^* = -0.5$ in comparison with Bayferrox 330.

In the thermal stability test based on the imco test, the pigment obtained was stable at 110° C. There was no temperature increase in the product in the course of 12 hours.

Without combustion in an excess of air (89 instead of 95 $m^3$ (S.T.P.)/h of air), the pigment having the same blue tinge and the same colour strength was obtained. In the thermal stability test at an oven temperature of 110° C., a temperature increase up to 650° C. in the product was measured after only 6 hours.

EXAMPLE 2

An indirectly heated rotary tubular kiln (length 2m, diameter 30 cm) was charged with 40 kg/h of the completely dried iron oxide black starting pigment of Example 1. 4 m³ (S.T.P.)/h of nitrogen mixed with 140 l/h of air (=0.7% by volume of $O_2$) were passed countercurrent to the solid in the oven at 700° C. After the product had been cooled, a black pigment having a colour strength of 140%, relative to Bayferrox 330 (commercial product from Bayer AG) was obtained The blue tinge $\Delta b^*$ was −0.75 unit with respect to the same comparison pigment. The pigment obtained was stable at 110° C.

Without the addition of air in the heating gas, a black pigment which had the same colour strength and same blue tinge but which did not pass the thermal stability test at 110° C. was obtained under otherwise identical conditions.

What is claimed is:

1. A process for the preparation of iron oxide black pigments obtained by the nitrobenzene reduction process, the process characterised in that the iron oxide black is heated in a final stage at temperatures from 400° to 800° C. in an oxidising atmosphere containing from 0.1 to 3% by volume of oxygen.

2. A process as claimed in claim 1 wherein the temperature is 600°–700°.

3. A process as claimed in claim 1 further characterised in that the iron oxide black is milled.

4. A process as claimed in claim 1 wherein said heating is carried out by feeding gases to the heating stage and the gases fed to the heating stage contain oxygen in an amount of 0.1 to 3% by volume.

5. A process as claimed in claim 4 wherein said gases contain oxygen in an amount of 0.3 to 1.0% by volume.

6. A process as claimed in claim 1 wherein the iron oxide black pigments obtained by the nitrobenzene reduction process comprise a water-containing iron oxide black having a solids contents of 60 to 99% by weight.

7. A process as claimed in claim 1 wherein heating is carried out in a directly heated rotary tubular kiln.

8. A process as claimed in claim 1 wherein heating is carried out in an indirectly heated rotary tubular kiln.

9. The thermally stable iron oxide black pigments obtained by the process set forth in claim 1.

10. The thermally stable iron oxide black pigments obtained by the process set forth in claim 3.

11. The thermally stable iron oxide black pigments obtained by the process set forth in claim 4.

12. The thermally stable iron oxide black pigments obtained by the process set forth in claim 6.

* * * * *